(12) United States Patent
Kuo et al.

(10) Patent No.: US 9,919,968 B2
(45) Date of Patent: Mar. 20, 2018

(54) LOW-TO-MID-RANGE WATER REDUCTION USING POLYCARBOXYLATE COMB POLYMERS

(71) Applicant: W. R. Grace & Co.-Conn., Columbia, MD (US)

(72) Inventors: Lawrence L. Kuo, Acton, MA (US); Izabela Goc-Maciejewska, Skorzewo (PL); Natalia Jaskula, Kolo (PL)

(73) Assignee: GCP Applied Technologies Inc., Cambridge, MA (US)

( * ) Notice: Subject to any disclaimer, the term of this patent is extended or adjusted under 35 U.S.C. 154(b) by 6 days.

(21) Appl. No.: 14/623,871

(22) Filed: Feb. 17, 2015

(65) Prior Publication Data

US 2016/0090323 A1 Mar. 31, 2016

Related U.S. Application Data

(60) Provisional application No. 62/057,558, filed on Sep. 30, 2014.

(51) Int. Cl.
| | |
|---|---|
| C04B 24/28 | (2006.01) |
| C04B 24/16 | (2006.01) |
| C04B 24/26 | (2006.01) |
| C04B 28/02 | (2006.01) |
| C04B 103/00 | (2006.01) |
| C04B 103/30 | (2006.01) |

(52) U.S. Cl.
CPC ........ C04B 24/165 (2013.01); C04B 24/2647 (2013.01); C04B 24/2658 (2013.01); C04B 28/02 (2013.01); C04B 2103/006 (2013.01); C04B 2103/302 (2013.01)

(58) Field of Classification Search
CPC .......... C04B 24/2688; C04B 24/2694
See application file for complete search history.

(56) References Cited

U.S. PATENT DOCUMENTS

| | | | |
|---|---|---|---|
| 4,471,100 A | 9/1984 | Tsubakimoto et al. | |
| 4,808,641 A | 2/1989 | Yagi et al. | |
| 4,978,392 A | 12/1990 | Kilbarger et al. | |
| 5,100,984 A | 3/1992 | Burge et al. | |
| 5,369,198 A | 11/1994 | Albrecht et al. | |
| 5,393,343 A | 2/1995 | Darwin et al. | |
| 6,187,841 B1 | 2/2001 | Tanaka et al. | |
| 6,352,952 B1 | 3/2002 | Jardine et al. | |
| 6,376,581 B1 | 4/2002 | Tanaka et al. | |
| 6,727,315 B2 | 4/2004 | Yamamoto et al. | |
| 7,368,488 B2 | 5/2008 | Nishikawa et al. | |
| 7,375,163 B2 | 5/2008 | Schober | |
| 7,482,405 B2 | 1/2009 | Matsumoto et al. | |
| 7,505,445 B2 | 3/2009 | Yamamata et al. | |
| 7,638,563 B2 | 12/2009 | Nishikawa et al. | |
| 2011/0160349 A1* | 6/2011 | Frunz | C04B 24/2647 524/4 |

FOREIGN PATENT DOCUMENTS

| | | |
|---|---|---|
| EP | 0291073 | 3/1992 |
| EP | 0537870 | 4/1993 |
| EP | 0850894 | 3/1997 |
| EP | 1547986 | 5/2008 |
| JP | 59162157 | 9/1984 |
| JP | 59162161 | 9/1984 |

* cited by examiner

*Primary Examiner* — Wenwen Cai
(74) *Attorney, Agent, or Firm* — Craaig K. Leon

(57) ABSTRACT

Methods for plasticizing cementitious mixtures having relatively high water/cement ratio (at least 0.40 or higher) are surprisingly improved in terms of dosage efficiency, compared to conventional "superplasticizer" polycarboxylate polymers, when the polycarboxylate polymer is formed from particularly small-sized, specifically selected monomer constituents: (A) polyoxyalkylene monomer represented by the structural formula $(R^1)(R^3)C=C(R^2)((CH_2)_m(CO)_nO(CH_2)_o(AO)_pR^4)$ wherein $(AO)_p$ represents linear ethylene oxide groups and p is 5-23 and more preferably 5-15; (B) unsaturated carboxylic acid represented by $(R^5)(R^7)C=C(R^6)(C(O)OM)$ wherein M represents an alkali metal, the ratio of component A to component B being 20:80 to 50:50; and, optionally, (C) a hydrophilic monomer represented by $(R^8)(R^9)C=C(R^{10})(CX)$ wherein $R^8$, $R^9$, and $R^{10}$ each represent hydrogen or methyl group, and X represents $C(O)NH_2$, $C(O)NHR^{11}$, $C(O)NR^{12}R^{13}$, $SO_3H$, $C_6H_4SO_3H$, or $C(O)NHC(CH_3)_2CH_2SO_3H$, or mixture thereof, wherein $R^{11}$, $R^{12}$, and $R^{13}$ each represent a $C_1$ to $C_5$ alkyl group.

12 Claims, No Drawings

LOW-TO-MID-RANGE WATER REDUCTION USING POLYCARBOXYLATE COMB POLYMERS

FIELD OF THE INVENTION

The present invention relates to modification of hydratable cementitious compositions; and, more particularly, to plasticizing concretes and mortars having a relatively high water/cement ratio using a polycarboxylate comb type copolymer having 5-23 linear repeating ethylene oxide units and being devoid of propylene oxide or higher oxyalkylene groups.

BACKGROUND OF THE INVENTION

Water-reducing admixtures reduce the amount of water used for fluidifying concrete mixes, and this means that the concrete needs less water to reach a required slump as compared to untreated concrete. A lower water-cement ratio (w/c) can lead to higher strength concrete without increasing the cement amount.

Polycarboxylate ("PC") type cement dispersants are known for high range water reduction ("HRWR") whereby water content is reduced by 12-30 percent compared to untreated concrete. HRWR plasticizers are referred to as "superplasticizers" and allow concrete to be highly fluid and to be placed quickly with little or no compaction efforts required.

For example, U.S. Pat. No. 6,187,841 of Tanaka et al. disclosed PC HRWR copolymers having (alkoxy)polyalkylene glycol mono(meth)acrylic ester type monomers and (meth)acrylic acid type monomers. However, this reference emphasizes the need to use large molecular sizes to achieve ideal water reduction conditions. In another example, EP 0 850 894 B1 of Hirata et al. disclosed PC HRWR polymers having polyalkylene glycol ether-based monomers and maleic acid based monomers for achieving high water reducing capabilities, and similarly disclosed molecular size ranges extending upwards to 100,000. Both examples reflect preferences for using a large number of alkylene oxide groups.

In contrast to the extensive polycarboxylate polymer size and weight ranges taught in these exemplary art references, the commercial reality in the concrete industry is that non-PC cement dispersants, such as lignin type plasticizers, are primarily used for low-to-mid-range plasticization of concrete mixes instead of HRWR PC polymers. It appears that polycarboxylate type polymers tend to be reserved for high range water reduction applications, i.e., for achieving the 12 to 30 percent reduction in hydration water that ordinarily would be deployed in HRWR applications.

It is an objective of the present invention to provide an alternative to lignin type water reducers, by achieving low-range and mid-range water reduction in concrete and mortar while using a polycarboxylate type cement dispersant copolymer, and while also achieving greater performance, in terms of admixture dosage efficiency at lower water cuts (i.e., below 12 percent water cut) as compared to conventional (e.g., larger, commercial-scale) polycarboxylate type polymers that are typically used for high range water reduction (HRWR) applications.

SUMMARY OF THE INVENTION

In providing a performance improvement over prior art polycarboxylate (PC) type "superplasticizers" or HRWR cement dispersant polymers, the present invention describes a method for achieving low-to-mid-range reduction of hydration water in concrete or mortar mixes using specifically sized PC copolymer constituents.

The present invention also reflects an unexpected and surprising improvement, in terms of admixture dosage efficiency at certain high water-cement (w/c) ratios, when PC copolymers taught by the present invention were compared to commercial reference PC polymers used in conventional HRWR applications.

Thus, an exemplary method of the present for achieving low-to-mid-range-plasticizing of a hydratable cementitious composition using a polycarboxylate copolymer, comprises: combining with water and cement to form a hydratable cementitious mixture, wherein the amount of water and cement is within a water/cement ratio (w/c) of at least 0.4 and more preferably at least 0.45, and further wherein the w/c ratio does not exceed 0.80 and more preferably does not exceed 0.75, at least one polycarboxylate comb type copolymer having the following monomer constituents:

(A) polyoxyalkylene monomer represented by structural formula:

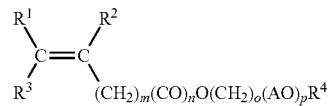

wherein $R^1$ and $R^2$ individually represent hydrogen atom or methyl group; $R^3$ represents hydrogen or —COOM group wherein M is a hydrogen atom or an alkali metal; $(AO)_p$ represents linear repeating ethylene oxide groups and "p" represents the average number of repeating ethylene oxide groups and is an integer from 5 to 23; "m" represents an integer of 0 to 2; "n" represents an integer of 0 or 1; "o" represents an integer of 0 to 4; and $R^4$ represents a hydrogen atom or $C_1$ to $C_4$ alkyl group;

(B) unsaturated carboxylic acid monomer represented by structural formula:

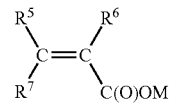

wherein $R^5$ and $R^6$ individually represent hydrogen atom or methyl group; $R^7$ represents hydrogen or —COOM group; M is a hydrogen atom or an alkali metal; and, optionally, (C) unsaturated, water-soluble hydrophilic monomer represented by structural formula:

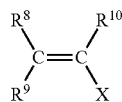

wherein $R^8$, $R^9$ and $R^{10}$ each independently represent a hydrogen atom or methyl group; X represents $C(O)NH_2$, $C(O)NHR^{11}$, $C(O)NR^{12}R^{13}$, $SO_3H$, $C_6H_4SO_3H$, or $C(O)NHC(CH_3)_2CH_2SO_3H$, or mixture thereof, wherein $R^{11}$, $R^{12}$, and $R^{13}$ each independently represent a $C_1$ to $C_5$ alkyl group; and wherein the molar ratio of component (A) to component (B) is from 20:80 to 50:50, and further wherein the molar ratio of component (C) to the sum of component (A) and component (B) is 0:100 to 20:80; and wherein said at least one polycarboxylate comb type co-polymer is devoid of repeating oxyalkylene units having three or more carbon atoms or more, and is devoid of branched repeating oxyalkylene units.

In preferred embodiments, the copolymer formed from components (A), (B), and optionally (C) has a weight-average molecular weight of 14,000-25,000, and more preferably 15,000-20,000, as measured by gel permeation chromatography (using polyethylene glycol as standards and with conditions described in further detail hereinafter). The present invention also relates to cementitious compositions, including concrete and mortar, made according to the exemplary method described above.

Further benefits and features of the invention will be discussed in further greater hereinafter.

DETAILED DESCRIPTION OF EXEMPLARY EMBODIMENTS

As summarized previously, the present invention provides method and cementitious compositions whereby low-to-mid range water reduction is achieved using specific structures and sizing within the polycarboxylate comb-type polymer structure.

The term "cementitious" refers to materials that comprise Portland cement or which otherwise function as a binder to hold together fine aggregates (e.g., sand), coarse aggregates (e.g., crushed gravel), or mixtures thereof. he term "cement" as used herein includes hydratable cement and Portland cement which is produced by pulverizing clinker consisting of hydraulic calcium silicates and one or more forms of calcium sulfate (e.g., gypsum) as an interground additive. Typically, Portland cement is combined with one or more supplemental cementitious materials, such as Portland cement, fly ash, granulated blast furnace slag, limestone, natural pozzolans, or mixtures thereof, and provided as a blend.

The term "hydratable" as used herein refers to cement and/or cementitious materials that are hardened by chemical interaction with water. Portland cement clinker is a partially fused mass primarily composed of hydratable calcium silicates. The calcium silicates are essentially a mixture of tricalcium silicate ($3CaO \cdot SiO_2$ "$C_3S$" in cement chemists notation) and dicalcium silicate ($2CaO \cdot SiO_2$, "$C_2S$") in which the former is the dominant form, with lesser amounts of tricalcium aluminate ($3CaO \cdot Al_2O_3$, "$C_3A$") and tetracalcium aluminoferrite ($4CaO \cdot Al_2O_3-Fe_2O_3$, "$C_4AF$"). See e.g., Dodson, Vance H., *Concrete Admixtures* (Van Nostrand Reinhold, New York N.Y. 1990), page 1.

The term "concrete" as used herein refers generally to a hydratable cementitious mixture comprising water, cement, sand, a coarse aggregate such as crushed gravel or stone, and one or more optional chemical admixtures.

As used herein, the term "copolymer" or "polymer" refers to compounds containing constituents derived or formed from the use of two different monomer components (designated as components "A" and "B") and optionally from the use of three different monomer components (i.e., further including at least one optional monomer designated as "C"), as described in exemplary methods of the invention and cementitious compositions made by the methods of the invention.

Thus, an exemplary method of the present invention comprises: combining with water and hydratable cement, to form a hydratable mixture having a water/cement (w/c) ratio of at least 0.40 and more preferably at least 0.45, and wherein the w/c ratio is no greater than 0.80 and more preferably no greater than 0.75, at least one air detraining agent and at least one polycarboxylate comb type polymer having the following monomeric constituents:

(A) polyoxyalkylene monomer represented by structural formula:

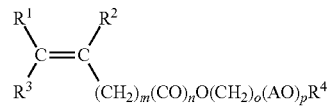

wherein $R^1$ and $R^2$ individually represent hydrogen atom or methyl group; $R^3$ represents hydrogen or —COOM group wherein M is a hydrogen atom or an alkali metal; $(AO)_p$ represents linear repeating ethylene oxide groups and "p" represents the average number of repeating ethylene oxide groups and is an integer from 5 to 23 (more preferably, "p" is an integer from 5 to 15; and, most preferably, 8 to 12); "m" represents an integer of 0 to 2; "n" represents an integer of 0 or 1; "o" represents an integer of 0 to 4; and $R^4$ represents a hydrogen atom or $C_1$ to $C_4$ alkyl group (most preferably, $R^4$ represents a $C_1$ or methyl group);

(B) unsaturated carboxylic acid monomer represented by structural formula:

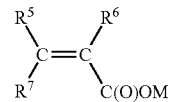

wherein $R^5$ and $R^6$ individually represent hydrogen atom or methyl group; $R^7$ represents hydrogen or —COOM group; M is a hydrogen atom or an alkali metal; and, optionally, (C) unsaturated, water-soluble hydrophilic monomer represented by structural formula:

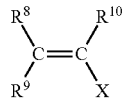

wherein $R^8$, $R^9$ and $R^{10}$ each independently represent a hydrogen atom or methyl group; X represents $C(O)NH_2$, $C(O)NHR^{11}$, $C(O)NR^{12}R^{13}$, $SO_3H$, $C_6H_4SO_3H$, or $C(O)NHC(CH_3)_2CH_2SO_3H$, or mixture thereof, wherein $R^{11}$, $R^{12}$, and $R^{13}$ each independently represent a $C_1$ to $C_5$ alkyl group; and wherein the molar ratio of component (A) to component (B) is from 20:80 to 50:50, and further wherein the molar ratio of component (C) to the sum of component (A) and component (B) is 0:100 to 20:80; and wherein said at least one polycarboxylate comb type co-polymer is devoid of repeating oxyalkylene units having three or more carbon atoms or more, and is devoid of branched repeating oxyalkylene units.

In exemplary methods of the present invention, the hydratable cementitious mixture is a concrete (which contains aggregates) designed for low-to-mid range water reduction applications, wherein the cement-to-concrete ratio is 240 to 340 kg/m³. This contrasts with concretes typically used with superplasticizers designed for high range water reduction (HRWR) wherein the cement-to-concrete is usually at least 350 kg/m³.

In further exemplary embodiments, the molar ratio of component (A) to component (B) is, preferably, from 20:80 to and including 50:50; more preferably, from 25:75 to and including 35:65; and, most preferably, from 25:75 to and including 30:70.

The molar ratio of component (C) to the sum of component (A) and component (B) ranges from 0:100 to 20:80, and more preferably from 0:100 to 10:90. When component (C) is present, the range is more preferably from 0.25:99.75 to 10:90.

The term "comprises" when used to describe the monomer components means that the polycarboxylate copolymer is formed from monomer components (A), (B), and optionally (C) and may be formed from additional monomers (i.e., in addition to) having different structure or groups apart from what has been described for monomers (A), (B), and (C); whereas "consists essentially of" means, depending upon context, that constituents of the polycarboxylate copolymer are formed from using monomer components (A) and (B) only or from using monomer components (A), (B), and (C) only. Hence, in exemplary methods of the invention, the polycarboxylate copolymer may be formed using monomer components (A) and (B) only, or using (A), (B), and (C) only.

The weight-average molecular weight of the polycarboxylate copolymer is 14,000-25,000 as measured by gel permeation chromatography (GCP) using polyethylene glycol (PEG) as standards and in accordance with the GPC conditions described in Example 1 below. More preferably, the weight-average molecular weight of the polycarboxylate copolymer polymer is 15,000-20,000 in accordance with the GPC conditions described in Example 1 below.

Examples of monomers for component (A) include, but are not limited to, poly(ethylene glycol)methyl ether acrylate, poly(ethylene glycol)methyl ether methacrylate, poly(ethylene glycol)methyl ether maleate monoester, poly(ethylene glycol)methyl ether fumarate monoester, N-poly(ethylene glycol) acrylamide, N-poly(ethylene glycol) methacrylamide, poly(ethylene glycol) vinyl ether, poly(ethylene glycol) allyl ether, poly(ethylene glycol) methallyl ether, poly(ethylene glycol) isoprenyl ether, poly(ethylene glycol)vinyloxybutylene ether, wherein the nominal molecular weight of the polyoxy ethylene-containing monomer of component A is in the range of 300 to 1,600 and more preferably in the range of 500 to 1,200 (again using PEG as standards and GPC chromatography conditions as described in Example 1 below).

Examples of monomer component (B) include, but not limited to, acrylic acid, methacrylic acid, maleic acid, $C_1$-$C_4$ alkyl maleic monoester, maleic monoamide, N—($C_1$-$C_4$) alkyl maleic monoamide, fumaric acid, $C_1$-$C_4$ alkyl fumaric monoester, N—($C_1$-$C_4$) alkyl fumaric monoamide, crotonic acid, itaconic acid, or mixtures thereof.

Examples of unsaturated, water-soluble monomer of optional monomer component (C) include, but not limited to, acrylamide, methacrylamide, N-alkyl acrylamide, N-alkyl methacrylamide, N,N-dialkyl acrylamide, N,N-dialkyl methacrylamide, vinylsulfonic acid, allylsulfonic acid, methallylsulfonic acid, 3-acrylamido-2-methylpropane sulfonic acid, styrene sulfonic acid, salts of these acids, or mixtures thereof.

A conventional air detraining (defoaming) agent may be used in combination with the polycarboxylate copolymer as contemplated within the present invention, and used in an amount as deemed necessary or desired by the admixture formulator or applicator.

As further example of air detraining agents which can be employed in the present invention, EP 0 415 799 B1 of Gartner taught air-detraining nonionic surfactants which included phosphates (e.g., bributylphosphate), phthalates (e.g., diisodecylphthalate), and polyoxypropylene-polyoxyethylene block copolymers (which are not deemed to be superplasticizers) (See EP 0 415 799 B1 at page 6, ll. 40-53). As another example, U.S. Pat. No. 5,156,679 of Garner taught use of alkylate alkanolamine salts (e.g., N-alkylalkanolamine) and dibutylamino-w-butanol as defoamer. U.S. Pat. No. 6,139,623 of Darwin et al. disclosed antifoaming agents selected from phosphate esters (e.g., dibutylphosphate, tributylphosphate), borate esters, silicone derivatives (e.g., polyalkyl siloxanes), and polyoxyalkylenes having defoaming properties. U.S. Pat. No. 6,858,661 of Zhang et al. disclosed a tertiary amine defoamer having an average molecular weight of 100-1500 for creating stable admixture formulations. As yet another example, U.S. Pat. No. 8,187,376 of Kuo et al., disclosed the use of a polyalkoxylated polyalkylene polyamine defoamer. All of the foregoing references, which are owned by the common assignee hereof, are incorporated herein by reference.

As another example of an air detraining agents which can be employed in the present invention, U.S. Pat. No. 6,545,067 of Buchner et al. (BASF) disclosed butoxylated polyalkylene polyamine for reducing air pore content of cement mixes. U.S. Pat. No. 6,803,396 of Gopolkrishnan et al. (BASF) disclosed low molecular weight block polyether polymers described as containing ethylene oxide and propylene oxide units as detrainers. In addition, U.S. Pat. No. 6,569,924 of Shendy et al. (MBT Holding AG) disclosed the use of solubilizing agents for solubilizing water-insoluble defoamers. The foregoing references are also incorporated herein by reference.

Further compositions and methods of the invention may further comprise or include the use of at least one other agent selected from the group consisting of (i) a non-high range water reducer (non-HRWR) such as (sodium gluconate); (ii) an alkanolamine (such as triethanolamine, triisopropanolamine, diethylisopropanolamine, or mixture thereof); (ii) a second defoamer which is different in terms of chemical structure from the first defoamer employed, (iv) an air-entraining agent such as a higher trialkanolamine such as triisopropanolamine or diethylisopropanolamine, a lignosulfonate, a naphthalene sulfonate, a melamine sulfonate, an oxyalkylene-containing non-HRWR plasticizer, an oxyalkylene-containing shrinkage reducing agent (which does not function as a HRWR additive), or a mixture thereof.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are based on weight or percentage by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above, is also specifically disclosed.

Example 1

This section describes an exemplary process for making polycarboxylate low-to-mid-range plasticizer for use in the present invention. A three-neck round bottom flask is fitted with a mantle heater, and a thermocouple is connected to a temperature controller and mechanical stirrer. A reactor is charged with de-ionized water, purged with argon gas, and then heated to 65° C. A solution of poly(ethylene glycol) methyl ether methacrylate (MPEGMA), methacrylic acid (MAA) or acrylic acid (AA), 3-mercaptopropionic acid and de-ionized water is prepared in advance. Separately, a solution of ammonium persulfate in de-ionized water is prepared. Once the temperature of the reactor reaches 65° C., both solutions are added drop-wise over a period of 1.5 hour while stirring. After the addition is completed, the reaction is continued for another 2.0 hours at 68-70° C. and then stopped by cooling to ambient temperature.

GPC Conditions.

The weight-average molecular weights of the resulting polymers (and other oxyalkylene containing molecules) can be measured by employing gel permeation chromatography (GPC) using the following separation columns and polyethylene glycol (PEG) as standards: ULTRAHYDROGEL™ 1000, ULTRAHYDROGEL™ 250 and ULTRAHYDROGEL™ 120 columns. The GPC processing conditions are as follows: 1% aqueous potassium nitrate as elution solvent, flow rate of 0.6 mL/min., injection volume of 80 μL, column temperature at 35° C., and refractive index detection.

Various properties of the polycarboxylate (co)polymer sample as well as of reference samples are listed below in Table 1.

TABLE 1

| Sample Identification | MW of MPEGMA | MPEGMA [mol] | MAA [mol] | AA [mol] | Molar ratio of MPEGMA to MAA or AA | Weight-average Mw [Da] |
|---|---|---|---|---|---|---|
| Sample 1 | 500 | 0.50 | 1.50 | — | 1.0:3.0 | 16k |
| Sample 2 | 500 | 0.50 | — | 1.40 | 1.0:2.8 | 20k |
| Reference 1 | 2,000 | 0.50 | 1.50 | — | 1.0:3.0 | 17k |
| Reference 2 | 5,000 | 0.50 | 1.50 | — | 1.0:3.0 | 20k |
| Reference 3[1] | 2,000 | — | — | — | 1.0:4.4 | 17k |

[1]Reference 3 is a commercial polycarboxylate product.

Example 2

This example illustrates the water-reducing effect of polycarboxylate polymers of the present invention by measuring the slump of concrete. Concrete mixes are made fabricated using the following proportions: cement (300 kg/m3), sand (772 kg/m3), stone (1,158 kg/m3), and water. The amount of water is varied depending on the type of cement and the weight ratios of water to cement (w/c) are 0.51, 0.58 and 0.55 for fly ash-blended cement CEM II/B-V 32.5R, slag-blended cement CEM II/B-S 32.5R, and limestone-blended cement CEM II/A-LL 42.5R, respectively.

The results are shown in Table 2 wherein the slump was measured as a function of percentage of active polymer dosage to cement.

TABLE 2

| Sample Identification | CEM II/B-V 32.5R w/c = 0.51 | | CEM II/B-S 32.5R w/c = 0.58 | | CEM II/A-LL 42.5R w/c = 0.55 | |
|---|---|---|---|---|---|---|
| | Dosage [% s/c] | Slump [mm] | Dosage [% s/c] | Slump [mm] | Dosage [% s/c] | Slump [mm] |
| Sample 1 | 0 | 75 | 0 | 60 | 0 | 70 |
| | 0.04 | 115 | 0.05 | 140 | 0.065 | 120 |
| | 0.06 | 150 | 0.07 | 200 | 0.08 | 170 |
| Reference 1 | 0 | 75 | 0 | 60 | 0 | 70 |
| | 0.06 | 100 | 0.05 | 115 | 0.065 | 110 |
| | 0.09 | 140 | 0.07 | 180 | 0.08 | 135 |
| Reference 2 | 0 | 75 | 0 | 60 | 0 | 70 |
| | 0.06 | 85 | 0.05 | 85 | 0.065 | 100 |
| | 0.09 | 100 | 0.07 | 155 | 0.08 | 120 |

As shown in Table 2, Sample 1 exhibited higher slump than both Reference samples at equal polymer dosages. These results indicate the greater water-reducing efficiency of the polycarboxylate polymers having lower molecular weight poly(ethylene glycol) units, at these w/c ratios.

Example 3

The performance of the polycarboxylate polymer (Sample 2) made according to Example 1 was evaluated in concrete with a commercially available polymer (Reference 3). The test protocol described in Example 2 was employed, except that the weight ratios of water to cement were 0.53, 0.57, and 0.55 for fly ash-blended cement CEM II/B-V 32.5R, slag-blended cement CEM II/B-S 32.5R, and limestone-blended cement CEM II/A-LL 42.5R, respectively. The results are summarized in Table 3.

TABLE 3

| Sample Identification | CEM II/B-V 32.5R w/c = 0.53 | | CEM II/B-S 32.5R w/c = 0.57 | | CEM II/A-LL 42.5R w/c = 0.55 | |
|---|---|---|---|---|---|---|
| | Dosage [% s/c] | Slump [mm] | Dosage [% s/c] | Slump [mm] | Dosage [% s/c] | Slump [mm] |
| Sample 2 | 0 | 75 | 0 | 60 | 0 | 80 |
| | 0.05 | 130 | 0.04 | 115 | 0.07 | 155 |
| | 0.08 | 170 | 0.06 | 185 | 0.10 | 180 |
| Reference 3 | 0 | 75 | 0 | 60 | 0 | 80 |
| | 0.05 | 120 | 0.04 | 105 | 0.07 | 130 |
| | 0.08 | 145 | 0.06 | 150 | 0.10 | 150 |
| | 0.10 | 170 | — | — | — | — |

The results in Table 3 indicate that at the water/cement ratio indicate that the polycarboxylate polymers made in accordance with the present invention outperformed the commercially available polycarboxylate polymer having higher molecular weight poly(ethylene glycol) groups.

Example 4

This example compares the slump retaining performance of the polycarboxylate polymer (Sample 2) against a commercially available polymer (Reference 3). The test protocol described in Example 2 was employed, except that slump was measured at 10-minutes and 30-minutes after hydration. Dosage of polymer Sample 2 was adjusted such that it was 37% lower than that of polymer sample Reference 3 to obtain comparable initial slumps at the 10-minute mark.

TABLE 4

| | CEM II/A-LL 42.5R w/c = 0.55 | | |
|---|---|---|---|
| | Dosage | Slump [mm] | |
| Sample ID | [% s/c] | 10 min | 30 min |
| Sample 2 | 0.05 | 135 | 85 |
| Reference 3 | 0.08 | 140 | 85 |

It is evident from Table 4 that both materials exhibit similar slump retaining behavior although the dosage of the polycarboxylate polymer made in accordance with the teachings of the present invention was much lower.

Example 5

This example evaluates the slump retaining performance of a mixture of sodium gluconate (SG) and Sample 2 polycarboxylate polymer, as well as a mixture of SG with the commercially available polymer of Reference 3. For both mixtures, the amounts as well as the weight ratio of SG to polymer were identical. Concrete mixes were fabricated using the following proportions: cement (340 kg/m3), sand (921 kg/m3), stone (788 kg/m3), and water (224 kg/m3). The slump was measured at 10, 30, and 60 minute intervals. Table 5 shows the results obtained with Portland cement CEM I 42.5R at water to cement weight ratio of 0.66.

TABLE 5

| | CEM I 42.5 w/c = 0.66 | | | |
|---|---|---|---|---|
| Sample | Dosage | Slump [mm] | | |
| Identification | [% s/c] | 10 min | 30 min | 60 min |
| SG & Sample 1 | 0.26 | 165 | 120 | 110 |
| SG & Reference 3 | 0.26 | 125 | 95 | 85 |

The results in Table 5 clearly indicate that the water-reducing mixture containing the polycarboxylate copolymer of Sample 1 of the present invention exhibits much better slump retaining performance than the mixture containing commercial polymer Reference 3.

Example 6

In this example, the water-reducing performance is evaluated in concrete mixes wherein the weight ratios of water to cement were much lower than the above examples and thus each polymer was used in the manner of a high-range water reducer. The concrete mixes were prepared in the traditional manner as follows: cement (370 kg/m3), sand (700 kg/m3), stone (1,191 kg/m3), and water. The amount of water varied depending on the type of cement and the weight ratios of water to cement were 0.41, 0.41, and 0.40 for fly ash-blended cement CEM II/B-V 32.5R, slag-blended cement CEM II/B-S 32.5R, and ordinary Portland cement, respectively. The slumps were measured at various dosages and are summarized in Table 6.

TABLE 6

| Sample Identification | CEM II/B-S 32.5R w/c = 0.41 | | CEM II/B-V 32.5R w/c = 0.41 | | Normal Portland Cement w/c = 0.40 | |
|---|---|---|---|---|---|---|
| | Dosage [% s/c] | Slump [mm] | Dosage [% s/c] | Slump [mm] | Dosage [% s/c] | Slump [mm] |
| Sample 1 | 0 | 30 | 0 | 40 | 0 | 30 |
| | 0.07 | 100 | 0.07 | 140 | 0.13 | 70 |
| | 0.09 | 150 | — | — | 0.19 | 200 |
| Reference 1 | 0 | 30 | 0 | 40 | 0 | 30 |
| | 0.07 | 120 | 0.07 | 170 | 0.10 | 95 |
| | 0.09 | 215 | — | — | 0.13 | 195 |

The results shown in Table 6 indicate that the slump values achieved by using polycarboxylate copolymer Sample 1 of the present invention were significantly lower than those obtained by using Reference 1 at the low water-to-cement ratios, confirming that superplasticizers which are typified by Reference 1 have superior performance in high range water reduction compared to the copolymers of the present invention.

The results also confirm that the copolymer having lower molecular weight poly(ethylene glycol) groups performed more suitably at low-to-mid water ranges compared to copolymers having higher molecular weight poly(ethylene glycol) groups. This behavior at low water to cement ratios is surprisingly opposite to that when the water to cement ratios are higher.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Skilled artisans can make variations and changes based on the specification without departing from the spirit of the invention.

We claim:

1. A method for achieving low-to-mid-range reduction of hydration water in concrete or mortar mixes using at least one polycarboxylate comb copolymer, comprising:
    combining with water and cement to form a hydratable cementitious mixture, wherein low-range and mid-range water reduction is achieved at below 12 percent water cut and wherein the water/cement ratio is at least 0.45 and no greater than 0.75, at least one air detraining agent and the at least one polycarboxylate comb copolymer having a weight average molecular weight of 14,000-25,000, the at least one polycarboxylate comb copolymer being formed from the following monomer components:
    (A) polyoxyalkylene monomer represented by structural formula:

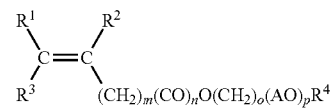

wherein $R^1$ and $R^2$ individually represent hydrogen atom or methyl group; $R^3$ represents hydrogen or —COOM group wherein M is a hydrogen atom or an alkali metal; $(AO)_p$ represents linear repeating ethylene oxide groups and "p" represents the average number of repeating ethylene oxide groups and is an integer from 5 to 23; "m" represents an integer of 0 to 2; "n" represents an integer of 0 or 1; "o" represents an integer of 0 to 4; and $R^4$ represents a hydrogen atom or $C_1$ to $C_4$ alkyl group;

(B) unsaturated carboxylic acid monomer represented by structural formula:

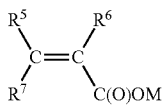

wherein $R^5$ and $R^6$ individually represent hydrogen atom or methyl group; $R^7$ represents hydrogen or —COOM group; M is a hydrogen atom or an alkali metal; and (C) unsaturated, water-soluble hydrophilic monomer represented by structural formula:

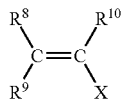

wherein $R^8$, $R^9$ and $R^{10}$ each independently represent a hydrogen atom or methyl group;

X represents $C(O)NH_2$, $C(O)NHR^{11}$, $C(O)NR^{12}R^{13}$, $SO_3H$, $C_6H_4SO_3H$, $C(O)NHC(CH_3)_2CH_2SO_3H$, or mixture thereof, wherein $R^{11}$, $R^{12}$, and $R^{13}$ each independently represent a $C_1$ to $C_5$ alkyl group; and wherein the molar ratio of component (A) to component (B) is from 20:80 to 30:70, and further wherein the molar ratio of component (C) to the sum of component (A) and component (B) is 0:100 to 10:90; and wherein the at least one polycarboxylate comb copolymer is devoid of oxyalkylene units having three or more carbon atoms, and is devoid of branched oxyalkylene units.

2. The method of claim 1 wherein the hydratable cementitious mixture is a concrete having a cement to concrete ratio within the range of 240 to 340 kg/m$^3$.

3. The method of claim 1 wherein, in the first component (A) polyoxyalkylene monomer, "p" is an integer of 5 to 15.

4. The method of claim 1 wherein, in the first component (A) polyoxyalkylene monomer, "p" is an integer of 8 to 12.

5. The method of claim 1 wherein, in the first component (A) polyoxyalkylene monomer, $R^4$ represents a methyl ($C_1$) group.

6. The method of claim 1 further comprising adding to the cement and water at least one additional admixture selected from the group consisting of an alkanolamine, a second air detraining agent which is different from the at least one air detraining agent, an air-entraining agent which is different from said alkanolamine, and mixtures thereof.

7. The method of claim 6 wherein the at least one additional admixture is mixed with the copolymer prior to combining with said cement and water.

8. The method of claim 1 wherein the molar ratio of component (A) to component (B) is from 25:75 to and including 30:70.

9. The method of claim 1 wherein the at least one polycarboxylate comb copolymer has a weight-average molecular weight of 15,000-20,000.

10. The method of claim 1 wherein the at least one polycarboxylate comb copolymer consists essentially of constituents formed from using only monomer components (A), (B), and (C).

11. The method of claim 1 wherein the molar ratio of component (C) to the sum of component (A) and component (B) is 0.25:99.75 to 10:90.

12. A cementitious material made by the method of claim 1.

* * * * *